United States Patent [19]

Charmot et al.

[11] Patent Number: 4,880,700

[45] Date of Patent: Nov. 14, 1989

[54] NOVEL ORIENTED POLYESTER FILM COMPOSITES

[75] Inventors: Dominique Charmot, Paris; Pierre Grosjean, Sainte-Foy Les Lyon, both of France

[73] Assignee: Rhone-Poulenc Films, Courbevoie, France

[21] Appl. No.: 84,219

[22] Filed: Aug. 12, 1987

[30] Foreign Application Priority Data

Aug. 12, 1986 [FR] France .................................. 86 11788

[51] Int. Cl.$^4$ ..................... B32B 27/08; B32B 27/10; B32B 27/36
[52] U.S. Cl. ..................................... 428/337; 428/341; 428/458; 428/480; 428/481; 428/482; 428/483
[58] Field of Search .............. 428/480, 482, 336, 337, 428/341, 483, 481, 458; 427/173; 430/535; 524/45, 602; 528/295

[56] References Cited

U.S. PATENT DOCUMENTS

| | | | |
|---|---|---|---|
| 2,627,088 | 2/1953 | Allis et al. | 427/173 X |
| 2,794,742 | 6/1957 | Fowler et al. | 430/535 |
| 4,340,519 | 7/1982 | Kotera et al. | 428/458 X |
| 4,476,189 | 10/1984 | Posey et al. | 428/336 |
| 4,571,363 | 2/1986 | Culbertson et al. | 428/482 X |
| 4,704,325 | 11/1987 | Crocker | 428/482 X |

*Primary Examiner*—Thomas J. Herbert
*Attorney, Agent, or Firm*—Burns, Doane, Swecker & Mathis

[57] ABSTRACT

Oriented polyester film composites comprise, on at least one face surface of the polyester base, a primer coating adapted to enhance the adhesion of topcoats thereto, said adhesive primer coating comprising a modified copolymer produced by aqueous phase radical polymerization of at least one acrylic monomer in the presence of a water-soluble or water-dispersible copolyester containing a plurality of sulfonyloxy groups.

25 Claims, No Drawings

NOVEL ORIENTED POLYESTER FILM COMPOSITES

BACKGROUND OF THE INVENTION

1. Field of the Invention

The present invention relates to novel oriented polyester films comprising, on at least one of the face surfaces thereof, a coating for improving the bonding between films employed as base substrates for a reactive outer layer, and the composite films thus produced.

2. Description of the Prior Art

The outstanding mechanical and chemical properties of linear polyester films derived from aromatic dicarboxylic acids and glycols have resulted in their great demand for various film-forming coatings and composite materials thereof useful in a wide variety of applications: wrapping, photographic films, films or sheets for the graphic arts (printing or drafting), metallized films, and tapes for recording sounds or, in particular, images.

Despite their advantages, polyester films have always presented a problem of adhesion between the base substrate and the final coating for a given application. This weak adhesion is generally attributed to the film surface structure and to the hydrophobic nature of the polyesters in particular. Various methods have been proposed to the art in attempts to solve this problem; thus, physical (flame treatment, corona discharges, abrasive treatment) or chemical (acid treatment) treatments of the film surface, in order to improve the bonding between the base and its coating, have been widely described. Since these various treatments are not without their disadvantages, the deposition, on at least one of the face surfaces of the film, of an intermediate coating exhibiting both good adhesion to the base film and good adhesion to the specific final coating for each application has been attempted.

Many polymers or copolymers have been proposed for producing these intermediate coatings which, for reasons of convenience, will be referred to hereinafter as an adhesive primer coating or anchor coating. The polymers most suitable for improving the adhesion of the final coatings to the polyester films are acrylic in nature (cf., for example, U.S. Pat. Nos. 2,794,742 and 2,627,088; French Patent No. 1,428,831; British Patent No. 1,075,533). These polymers may be thermoplastic or crosslinkable (cf. French Patent No. 1,428,831 and British Patent No. 1,075,533). The coating of the adhesive primer is done from organic solutions or, preferably, aqueous emulsions thereof. The coating operation may be carried out before the substrate film is drawn, where appropriate between two drawing operations, or even after the drawing operation(s), although application of the primer coating before drawing or between two draws produces the best results and, in particular, the best bonding between the primer and the base film (cf. aforementioned U.S. patents).

Although the use of acrylic polymers gives rise to a substantial increase in the adhesion of the final coatings to the polyester base films, the problem of this adhesion still has not been solved to a satisfactory extent. In fact, the acrylic coating must be adapted to each type of final coating in order to produce the greatest adhesion. The consequence of this, for the industrialist, is the requirement to have access to many alternative forms as a function of the nature of the final coating and of the nature of the coating medium (influence of the polarity, or of the hydrophilic or organic nature of this medium).

It has also been proposed to use, as an adhesive primer for polyester films, aqueous solutions or emulsions of water-soluble or water-dispersible copolyesters (cf. U.S. Pat. No. 4,476,189 and European Patent No. 78,559) which are produced by polycondensation of difunctional compounds containing sulfonyloxy groups. These anchor coatings are essentially suitable for hydrophilic coatings.

As a result, serious need exists in this art for primers which improve the adhesion of the greatest possible number of final coatings without the need for extensive modification of the composition of the primer as a function of the nature of the final coating. Stated differently, this art is in great need of primers which are as universal as possible in their nature.

SUMMARY OF THE INVENTION

Accordingly, a major object of this invention is the provision of improved linear polyester films comprising, on at least one face surface thereof, a novel primer coating layer which enhances adhesion to the base films of the final application coatings they are to receive.

Another object of the present invention is the provision of base films destined to receive final application coatings and including a linear polyester base film comprising, on at least one of the face surfaces thereof, a novel primer coating for improving the adhesion of the base film to such final application coatings.

Another object of this invention is the provision of novel base films for the fabrication of composite films comprising a final application coating.

Still another object of the invention is the provision of composite films produced by depositing a final application coating onto a linear polyester base film comprising, on at least one face surface thereof, a novel primer coating which enhances the adhesion of the base film to such final application coatings.

Briefly, the present invention features oriented polyester films comprising, on at least one of the face surfaces thereof, an adhesive primer coating comprising a modified polymer produced by aqueous phase radical polymerization of at least one acrylic monomer in the presence of an effective amount of a water-dispersible polyester derived from at least one aromatic dicarboxylic acid and at least one aliphatic diol and which comprises a plurality of sulfonyloxy groups of the general formula:

$$(-SO_3-)_n M \qquad (I)$$

in which:

n is equal to 1 or 2, and

M is a hydrogen atom, an alkali or alkaline earth metal, or an ammonium or quaternary ammonium cation.

DETAILED DESCRIPTION OF THE PREFERRED EMBODIMENTS OF THE INVENTION

More particularly according to the present invention, by the term "water-dispersible polyester" are intended polyesters which are soluble in water, or polyesters which form stable homogeneous dispersions in water. By "adhesive primer coating" or "primer" are intended coatings adapted to improve the cohesion between the polyester base film and a "final application coating".

This latter expression connotes the final coatings which endow the polyester films with their properties required for ultimate use (for example, films for graphic reproduction, photographic films, magnetic films, etc.).

It has now unexpectedly and surprisingly been found that the modified polymers produced by polymerization of at least one monomer, acrylic in nature, in the presence of a water-soluble or water-dispersible sulfonated polyester markedly improve the adhesion of widely varied hydrophilic or hydrophobic coatings to the polyester base films. In particular, it has now been found that the polymer produced in this manner imparts adhesion improvement of this type both onto acrylic polymers employed as primers and produced in the absence of sulfonated polyesters, and onto mixtures, prepared ad hoc, of acrylic polymers and sulfonated polyesters, and onto sulfonated polyesters in and of themselves.

The water-soluble or water-dispersible polyesters containing sulfonyloxy groups, which can be employed to prepare the adhesive primers according to the invention, are known materials, described particularly in French Patent Nos. 1,401,581 and 1,602,002 and published European Patent Application No. 0,129,674. For purposes of the present invention, the polyesters containing sulfonyloxy groups which are described in these patents are representative. More specifically, the water-soluble or water-dispersible polyesters employed for preparing the novel adhesive primers for polyester films are produced by polycondensation of one or more aromatic dicarboxylic acids with at least one or more aliphatic diols and at least one difunctional compound containing at least one sulfonyloxy group. For the sake of convenience of description, the expression "sulfonyloxy group" will hereinafter connote both hydroxysulfonyl groups and the alkali metal, alkaline earth metal or ammonium salts derived therefrom.

Among the aromatic dicarboxylic acids which can be employed for preparing the water-dispersible polyesters, representative are: terephthalic, isophthalic, phthalic, 1,4-naphthalenedicarboxylic and 4,4'-oxydibenzoic acids, bis(4-hydroxycarbonylphenyl)sulfone, and 4,4'-dihydroxycarbonylbenzophenone. These acids may be employed by themselves or in admixture thereof. Among the aforementioned acids, those which are preferred are terephthalic and isophthalic acids, by themselves or in combination with the other acids mentioned. Mixtures of terephthalic acid with one or more other aromatic dicarboxylic acids, and in particular with isophthalic acid, are particularly suitable for producing water-dispersible sulfonated polyesters. In this case, the amount of terephthalic acid, expressed in moles, may range from 20 to 99%, and preferably from 30 to 95%, of the total number of moles of unsulfonated dicarboxylic acids.

In the preparation of dispersible copolyesters, aliphatic dicarboxylic acids containing from 3 to 15 carbon atoms may be used in combination with the aromatic acids. More particularly, all or part of the aromatic acid employed together with terephthalic acid (for example, isophthalic acid) may be replaced with aliphatic acids such as adipic, suberic, sebacic, succinic or dodecanedioic acids.

In the preparation of water-dispersible sulfonated polyesters, the dicarboxylic acids may be replaced during the polycondensation with their derivatives which are usually employed in a reaction of this type: anhydrides, esters or acid chlorides. Esters, and the methyl esters in particular, are preferably used.

As examples of diols which can be employed for the preparation of the water-dispersible sulfonated polyesters, representative are: ethylene glycol, 1,4-butanediol, 1,3-butanediol, 1,3-propanediol, 1,2-propanediol, 2,2-dimethyl-1,3-propanediol, 1,5-pentanediol, 1,6-hexanediol, diethylene glycol, triethylene glycol, neopentyl glycol, cyclohexanedimethanol, tetraethylene glycol, and penta-, hexa- or decamethylene glycols. Ethylene glycol and its oligomers are particularly suited for the preparation of the sulfonated polyesters. They may e employed by themselves or mixed with each other and/or with other diols. Mixtures of ethylene glycol and of its oligomers of the formula $HO-CH_2-CH_2O)_nH$, in which n is an integer from 2 to 10, are preferred.

The sulfonyloxy groups of the formula $-SO_3M$ are introduced into the polyester by means of a difunctional compound, containing a sulfonyloxy group, capable of reacting with the dicarboxylic acids and/or the diols during the polycondensation. Examples of such monomers are noted in French Patent No. 1,602,002. Preferably, alkali metal salts of aromatic dicarboxylic acids containing sulfonyloxy groups are used, such as those of sulfoterephthalic, sulfoisophthalic, sulfophthalic, 4-hydroxysulfonyl-2,7-naphthalenedicarboxylic acids, or derivatives thereof, and in particular of their esters. The amount of difunctional compound containing a sulfonyloxy group which is present in the sulfonated polyester, expressed in moles for a total of 100 moles of difunctional compounds of the same nature, preferably ranges from 5 moles to 30 moles %. In general, amounts of sulfonated difunctional compounds which range from 8 moles to 15 moles for a total of 100 moles of difunctional compounds of the same nature are suitable. Thus, when an alkali metal salt of 5-hydroxysulfonylisophthalic acid is used, this compound may represent from 5 moles to 30 moles for a total of 100 moles of dicarboxylic acid recurring units present in the polyester.

The water-dispersible polyesters described earlier are produced using conventional processes, for example, by reacting the diol(s) with a mixture of methyl esters of the various acids required, in the presence of conventional transesterification catalysts, followed by polycondensation of the diol esters thus obtained. The amounts of each of the reactants are calculated such that the ratio of the total number of alcoholic hydroxyl groups to the total number of carboxylic groups preferably ranges from 2 to 2.5.

The acrylic monomers which are used for the preparation of the adhesive primers according to the present invention may be represented by the general formula:

(II)

in which:
R is a hydrogen atom or a lower alkyl radical, optionally substituted by a hydroxyl group;
Y is a hydroxycarbonyl radical, an alkoxycarbonyl radical of the formula $-COOR_1$ in which $R_1$ is a straight or branched chain alkyl radical containing from 1 to 20 carbon atoms (optionally substituted by a hydroxyl group), a nitrile radical, an amide radical of the formula $-CON(R_2,R_3)$ in which $R_2$ and $R_3$, which are identical or different, are each a hydrogen atom or a straight or branched chain alkyl radical containing from 1 to 20 carbon atoms, with the proviso that one of the radicals $R_2$ and $R_3$ may be a hydroxy-alkyl radical in which the alkyl moiety is as defined under $R_2$ and $R_3$. By "lower alkyl" radical are intended alkyl radicals containing from 1 to 4 carbon atoms.

As specific examples of the radicals $R_1$, $R_2$ and $R_3$, representative are: methyl, ethyl, n-propyl, isopropyl, n-butyl, isobutyl, tert-butyl, n-pentyl, n-hexyl, 2-ethylhexyl, decyl, dodecyl and octadecyl radicals.

As examples of the hydroxyalkyl radicals $R_1$, $R_2$ or $R_3$, representative are: hydroxymethyl, 2-hydroxyethyl, 3-hydroxypropyl and 4-hydroxybutyl radicals.

In the formula (II), R is preferably a hydrogen atom or a methyl or hydroxymethyl radical.

Among the acrylic derivatives of formula (I) which may be used for the preparation of the adhesive primers according to the invention, representative are: acrylic acid, methacrylic acid, acrylonitrile, methacrylonitrile, acrylamide, methacrylamide, N-methylolacrylamide, N-methylacrylamide, N-methylolmethacrylamide and methyl, ethyl, n-propyl, isopropyl, n-butyl, isobutyl, 2-ethylhexyl and stearyl acrylates and methacrylates. These monomers may be employed by themselves or as mixtures of two or more acrylic derivatives, depending on the final product properties required or the nature of the final coating. Thus, lipophilic (acrylic esters) and hydrophilic (acrylic and methacrylic acids, acrylamide) monomers may be combined in variable amounts to emphasize the hydrophilic or lipophilic nature of the final product or to provide a compromise between hydrophilicity and lipophilicity. When the final coating is a metal layer, it is preferable that the comonomers should include an acrylic or methacrylic acid. As an example of combination of acrylic derivatives, representative are the mixtures: methyl methacrylate/acrylic and/or methacrylic acid, methyl methacrylate/acrylic or methacrylic acid/ethyl acrylate, methyl methacrylate/ethyl acrylate/acrylamide or methacrylamide, acrylamide/methacrylamide, butyl acrylate/acrylic acid, and butyl methacrylate/ethyl acrylate.

The acrylic compounds may also be combined with a minor amount of one or more ethylenically unsaturated monomers such as vinyl acetate, vinylidene chloride, styrene, α-methylstyrene, and crotonic, itaconic, fumaric or maleic acids. The latter are most particularly suitable. In this case, the amount of nonacrylic ethylenic monomer is calculated such that the number of recurrent nonacrylic monomer recurring units in the copolymer, expressed in moles per 100 moles of acrylic monomer, should preferably be less than or equal to 20%, and still more preferably 10%. Amounts of ethylenic recurring units representing from 0.1 to 5% on a molar basis are suitable. Within the ambit of the present invention, it would be possible to combine a minor amount of a polyethylenically unsaturated monomer such as diallyl phthalate, divinylbenzene or a diol diacrylate or dimethacrylate (for example, ethylene diacrylate). The amount of such a monomer, expressed as above, is preferably less than 5 moles per 100 moles of monofunctional acrylic monomer. In general, it ranges from 0.1 mole to 3 moles %.

The usual techniques of radical polymerization of ethylenically unsaturated monomers in aqueous phase are followed for the preparation of the modified polymers intended for coating polyester films in accordance with the present invention. In general, the polymerization is carried out by dispersing the acrylic monomer(s) in a suitable volume of water, into which the required amount of a dispersible sulfonated polyester is introduced, together with, where appropriate one or more conventional emulsifying agents. In fact, although the sulfonated polyester may itself act as an emulsifier, enabling the monomer(s) to be dispersed in water, this does not exclude the use of the usual surface-active agents such as, for example, alkali metal salts of long-chain alcohol sulfates (sodium lauryl sulfate, ethanolamine lauryl sulfate), alkali metal salts of long-chain sulfonic acids, or nonionic emulsifiers such as polyoxyethylene glycols and their derivatives. The polymerization is initiated using the usual free radical generators such as peroxide compounds: persulfates, hydrogen peroxide, organic peroxides (lauroyl and benzoyl peroxides, t-butyl hydroperoxide), azo compounds (acodiisobutyronitrile), redox systems combining a peroxide compound, preferably water-soluble, and a reducing agent: ferrous salts (sulfate), or alkali metal sulfites or bisulfites.

Other usual polymerization adjuvants may be present in the reaction mixture. Thus, the operation may be carried out in the presence of a usual chain transfer agent such as mercaptans (dodecyl mercaptan, tetradecyl mercaptan), such as to regulate the molecular weight of the copolymer produced as a function of the final coating properties required.

The temperature at which the polymerization is carried out may vary over wide limits. In general, a temperature of from 10° to 100° C. and preferably from 20° to 80° C. is suitable.

Investigation of the product resulting from the polymerization of at least one acrylic monomer such as defined above, in the presence of a dispersible polyester, has made it possible to conclude that the polyester is chemically bound to the acrylic polymer. Without intending to be bound to any particular theory or reaction mechanism, it appears that the polyester and the acrylic monomer(s) react during the polymerization to form a grafted copolymer.

The minimum amount of dispersible polyester which is present in the product resulting from the polymerization depends to some degree on the nature of the dispersible polyester and of the acrylic monomer(s). This minimum amount is that which causes a significant improvement in the adhesion of the final coatings when compared with the acrylic polymers and/or the dispersible polyesters employed by themselves, or admixtures thereof. The determination of this minimum amount (or effective amount) may easily be done by one skilled in this art in each particular case.

To coat the polyester films according to the invention, it is preferable that the dispersible polyester in the product resulting from the polymerization represents at least 5% by weight and preferably at least 10% by weight of the total amount of dispersible polyester and acrylic (co)polymer. The presence of chemically unbonded dispersible polyester and/or of free acrylic (co)polymer is not prejudicial; it is therefore unnecessary to remove them from the emulsion produced. The amount of dispersible polyester may vary over wide limits. In general, this amount may represent up to 60% by weight of the total amount of dispersible polymer and acrylic (co)polymer. An amount of dispersible polyester of from 10 to 45% by weight is suitable.

The concentration of the dispersible polyester and of the polymerizable monomer(s) in the aqueous polymerization phase is not critical and may also vary over wide limits. This concentration is selected as a function of the required solids content for the final emulsion and of the degree of polymerization of the monomer(s) under the polymerization conditions.

The aqueous product obtained after polymerization may be directly employed for use according to the invention. It may also be subjected to various treatments. Thus, unconverted monomers may be removed by the usual means upon completion of the polymerization. When one or more of the reaction components contains free acid groups, the latter may be neutralized by addition of an inorganic or organic base; and alkaline base (sodium hydroxide, potassium hydroxide), a quaternary ammonium hydroxide or aqueous ammonia are preferably used. Sulfonic acid groups in the dispersible polyester and/or carboxylic acid groups in the acrylic (co)polymer may be involved. Adjuvants which are usually employed in the composition for an adhesive primer (fillers, stabilizers, lubricants, antiblocking agents, antistatic agents) may also be added to the resulting emulsion. According to one embodiment, known crosslinking agents for the acrylic (co)polymers may also be introduced into the product emulsion.

The nature of the crosslinking agents depends on the nature of the acrylic monomer(s). Among the preferred crosslinking agents, representative are: melamine, phenolformaldehyde resins, amine-formaldehyde resins such as the products of condensation of melamine with formaldehyde, urea with formaldehyde or triazine with formaldehyde. The amount of crosslinking agent then generally ranges from 0.1 to 15% by weight, and preferably from 0.5 to 12% by weight, based on the total weight of the dispersible polyester and of the acrylic (co)polymer present in the emulsion.

The product resulting from the polymerization is in various forms, depending on the proportion and the nature of the reactants employed and/or the polymerization conditions and/or the final treatment applied to the resulting product. Thus, the products resulting from the polymerization of a nonacidic acrylic monomer with a significant amount of a polymerizable acid [(meth)acrylic acid, crotonic acid], for example at least 5% on a molar basis of the total amount of the polymerizable monomers, may be in the form of a true emulsion when the carboxylic acid groups are free or in the form of more or less viscous aqueous solutions when the carboxylic groups are neutralized with one of the bases mentioned earlier, and in particular by means of an alkaline base. The viscosity of these solutions is not critical and may be adjusted at will as required by the use of a chain transfer agent during the polymerization.

The linear polyesters constituting the films which can be employed as the base according to the invention are polycondensation polymers of one or more aromatic dicarboxylic acids (for example, terephthalic acid or isophthalic acid), or of their derivatives (halides, esters), with at least one alkylene glycol (for example, ethylene glycol, 1,3-propanediol or 1,4-butanediol). These are preferably polyesters derived from terephthalic acid or from a mixture of terephthalic acid with another aromatic dicarboxylic acid (for example, isophthalic acid), the terephthalic acid content of the mixture being sufficient for the polymer to be substantially crystalline after drawing. The terephthalic acid content, expressed in moles per hundred moles of acid, is preferably at least 80.

For the purposes of the present invention, the preferred polyester is polyethylene terephthalate.

The linear polyester films used for coating may be oriented or unoriented. In the former case, they may have been subjected to an operation of drawing in one or two directions at right angles, followed by a heat-setting operation in a manner known per se. Preferably, unoriented films are used, or films oriented in only one direction. The thickness of the films after drawing may vary over wide limits; in general, the invention is applicable to films which have or which will have, after drawing and heat-setting, thicknesses of from 5 to 300 micrometers and more especially from 8 to 250 micrometers.

The deposition of the adhesive primer onto the polyester film may be carried out using the various techniques known to this art. Thus, the aqueous emulsion or solution of the polymer may be deposited by gravity from a slit pourer, or by passing the film through the emulsion or solution or, alternatively, by means of transfer rolls. The thickness of the layer is controlled by any appropriate means. The deposition of the coating may take place either before any drawing of the film (inline coating), or after drawing, before or after heat-setting (out of line coating). It is preferable, however, to perform the coating of the polyester film before the drawing operation or between two drawing operations.

Before being coated with the adhesive primer, the polyester film may be subjected to a surface treatment selected from those usually employed and more particularly from physical treatments. Thus, the surface intended to receive the adhesive primer may be subjected to electrical discharges (corona treatment) or to ionizing radiations. However, treatments of this type are not essential.

The amount of aqueous coating composition deposited onto the film depends, on the one hand, on its solids content and, on the other hand, on the required thickness of the final film coating, that is to say, after drawing and heat-setting when the coating is carried out in-line. This amount also depends on the time of the coating; regard must be given, naturally, to the change in the coating thickness before and after drawing, when the coating is performed before drawing. The final coating thickness may vary over wide limits. In general, the amount of aqueous coating composition is calculated such that the amount of dry material deposited onto the final film ranges from 0.01 to 0.5 g/m$^2$, and preferably from 0.05 to 0.3 g/m$^2$.

After coating, the polyester film is heat-treated to remove the water present in the coating and, where appropriate, to effect crosslinking of the polymer. In the case of in-line coating, it is generally unnecessary to apply a heat-treatment; the drying and, if desired, crosslinking take place during the drawing and the heat-setting. However, it is within the ambit of the present invention to apply, in this case, a heat treatment which is sufficient to cause the coalescence of the latex and the drying, before the drawing and heat-setting.

A second object of the present invention features oriented linear polyester films comprising an adhesive primer.

Most specifically, this invention features novel oriented linear polyester films comprising, on at least one face surface thereof, a crosslinked or otherwise primer coating acrylic in nature, characterized in that the said primer coating consists of a modified polymer produced by aqueous phase radical polymerization of at least one acrylic monomer, optionally with a nonacrylic ethylenic monomer, in the presence of an effective amount of a water-dispersible polyester derived from at least one aromatic dicarboxylic acid and at least one aliphatic diol and comprising a plurality of sulfonyloxy groups of the general formula:

$$(-SO_3-)_n M \qquad (I)$$

in which M and n are as defined above.

The polyester films with a primer coating, referred to hereinafter as composite base films, may find many applications after deposition of a final coating which is appropriate to each type of application. Thus, they may be employed as a base for photographic emulsions, as bases for coatings permitting printing or drawing (films for graphic arts), as a base for printable and/or complexable coatings for packaging, and as a magnetic base.

More especially, the composite base films according to the invention have outstanding adhesiveness to printing inks and particularly to those which generally have poor adhesiveness to polyester films such as nitrocellulose inks, to metal coatings such as those produced by vacuum metallizing (for example, an aluminum coating), and to the polymer coatings deposited by the usual coating, coextrusion, lamination and extrusion-coating methods. More particularly the composite polyester films according to the invention exhibit outstanding adhesiveness to films made of polyethylene, polyvinylidene chloride, polyvinyl alcohol, and ethylene/vinyl acetate and ethylene/vinyl alcohol copolymer.

In each case, the nature of the acrylic monomers and/or the dispersible polyester may be adapted to the nature of the final coating, such as to produce the highest possible adhesion between the primer and the final coating. Thus, for example, when the final coating is metallic in nature (for example, aluminum), it is preferable for the acrylic part of the product resulting from the polymerization in the presence of sulfonated copolyester to contain a sufficient amount of comonomer containing a free carboxylic acid group; the appropriate amount is determined by simple tests in each particular case.

The use of composite base, according to the invention, to prepare composite films comprising a final application coating constitutes a third object of the invention.

The composite films including a composite base according to the invention, and a final application coating, constitute a fourth object of the invention.

In order to further illustrate the present invention and the advantages thereof, the following specific examples are given, it being understood that same are intended only as illustrative and in nowise limitative.

EXAMPLE 1

(1) Preparation of a sulfonated polyester/acrylic monomers latex: The following materials were charged, cold, and under stirring, into a stainless-steel reactor with a jacket for circulating hot water, equipped with an anchor stirrer, a vertical condenser and a twin device for pumping reactants
  (i) 10 l of deionized water;
  (ii) 0.8 g of sodium vinyl sulfonate;
  (iii) 19.8 g of an emulsifier (nonylphenol ethoxylated with 30 moles of ethylene glycol per mole and sulfonated), marketed under the trademark AD 33 (Montanoir);
  (iv) 330 g of vinyl acetate;
  (v) 1650 g of a copolyester prepared from:

isophthalic acid . . . 0.524 mole
  dimethyl terephthalate . . . 0.348 mole
  sodium salt of the dimethyl ester of 5-sulfoisophthalic acid . . . 0.128 mole
  ethylene glycol . . . 2.3 moles and having a viscosity index of 556, measured at 25° C. on a solution containing 1 g of polymer per 100 ml of a mixture of phenol and o-chlorophenol in a 50/50 ratio by weight, and a number average molecular weight of 17,000. This copolyester had a diethylene glycol content of 13% by weight. The temperature of the reactor contents was raised to 60° C. and 33 g of ammonium persulfate dissolved in 120 g of deionized water were then added, with stirring.

The temperature of the reactor contents was raised to 80° C. over 1 hr, 30 min; a homogeneous mixture of 3135 g of methyl methacrylate (MMA), 2409 g of ethyl acrylate (EA), 726 g of methacrylic acid (MAA), 49.5 g of crotonic acid and 26.4 g of t-dodecyl mercaptan was added continuously over 8 hr, 30 min, beginning from the time when the temperature had reached 60° C., while the temperature was maintained at 80° C. 26.4 g of ammonium persulfate, 33 g of the above-mentioned emulsifier and 39.6 g of sodium bicarbonate in 1400 ml of water were then added continuously over 8 hours, beginning from the time when the temperature had reached 80° C. The reaction was continued for another 2 hours upon completion of this addition, and then the reactor contents were cooled to 20° C.

In this manner, a stable aqueous emulsion was obtained having a solids content of 42.7% by weight and with a particle size of 0.176 micrometer (measured in an instrument bearing the trademark Nano-Sizer, from Coultronic Ltd.). The latex solids had the following composition by weight:
  20% of sulfonated polyester based on the solids content,
  36.75% by weight of methyl methacrylate,
  28.4% by weight of ethyl acrylate,
  8.51% by weight of methacrylic acid,
  0.5% of crotonic acid,
  3.86% of vinyl acetate.

(2) Preparation of a polyester film coated with an adhesive primer:

The latex previously obtained was used to deposit an anchor layer onto a polyethylene terephthalate (PET) film having a viscosity index of 580. The procedure was as follows:

PET filled with 0.4% by weight of kaolinite and heated to 275° C. was extruded at a rate of 96 kg/hr through a slit die 450 mm wide onto a chill drum at 35° C., providing an extrusion speed of 6.05 m/min. The web produced was subjected to a lengthwise draw at a temperature of 75° C. which reduced its width to 380 mm (draw rate 20 m/min; draw ratio 3.2). 0.2 g/m² of the latex obtained under (1) was then deposited onto the uniaxially drawn film by means of a coating device comprising, in succession: a levelling roll, a lay-on roll, a coating roll rotating at 13 m/min and a smoothing roll rotating at 7 m/min, these latter two components being cooled to 10° C. The coated film then was transferred through a transverse drawing device of the stenter type comprising a plurality of zones in which the temperature ranged from 95° C. to 230° C. In a zone heated to 95°–110° C., the coated film was subjected to a transverse draw which increased its width to approximately 1,000 mm (draw ratio: 3.7). The coated, biaxially drawn film was then heat-set at 225°–235° C. and was then cooled and wound under a tension of 30 kg. It had a thickness of 36 micrometers.

In order to verify that the improvement in the adhesion of the final coatings to the PET was due to the anchor layer, various types of such final coatings were applied and adhesion tests were performed.

The deposition of the coating was carried out by manual coating, by means of a device bearing the trademark Hand Coater, in which the engraved coating bar was selected depending on the quantity of product to be deposited. The coated film was dried for two minutes in an oven at 130° C. The following coatings were produced:

Film A

Application, at a rate of 5 g of dry product per m², of a coating for diazo microfilm, in ketone solution, from the Messerli Company.

Film B

Coating for drafting, based on crosslinked polyvinyl alcohol containing fillers in an aqueous alcohol medium, applied at a rate of 8 g/m², from the REGMA Company.

Film C

Matt coating for drafting, consisting of an alcohol dispersion of silica in an acrylic binder, at a rate of 6 g/m², from the REGMA Company.

Film D

Diazo mounting coating based on cellulose derivatives in an alcohol/ketone medium, at a rate of 6 g/m², from the REGMA Company.

The dried coated films were permitted to stand for hours and coating stripping tests were then carried out by means of an adhesive tape bearing the trademark Magic tape no. 810, marketed by Minnesota Mining & Manufacturing Company. The tape was applied by hand and the stripping was carried out under conditions of increasing severity:
  (a) slow stripping,
  (b) fast stripping,
  (c) stripping after the final coating had been scratched with a razor blade,
  (d) stripping after crumpling of the film.

In each test, the strip strength was scored from 1 (easy complete stripping) to 10 (complete retention of the coating). Lastly, an overall score from 1 to 10, taking into account the scores awarded for each of the conditions (a) to (d), provided a general assessment for each film A, B, C and D. The results are reported in the following Table I:

TABLE I

| FILM | A | B | C | D |
|---|---|---|---|---|
| OVERALL SCORE | 8 | 8 | 7 | 8 |

This example was repeated with a latex prepared according to the method described under (1), using the same reactants in the same proportions, with the exception of crotonic acid and vinyl acetate. Closely similar results were obtained in the adhesion tests.

EXAMPLE 2

Following the same procedure as in Example 1, a polyester was prepared, modified with the same acrylic monomers used in the same proportions (but operating in the absence of the chain transfer agent), and with the proportion of sulfonated polyester in the solids increased to 40% by weight, followed by a PET film comprising an adhesive primer produced by the application of 0.15 g/m² of latex having a solids content of 45%.

The coatings deposited onto the films B, C and D of Example 1 were then applied onto specimens of the coated film. This produced films E, F and G which were subjected to adhesion tests. The test results are reported in the following Table II:

TABLE II

| FILM | E | F | G |
|---|---|---|---|
| OVERALL SCORE | 9 | 7 | 8 |

Comparative test

By way of comparison, polymerization of the mixture of the acrylic monomers of Example 2 was carried out under the same conditions, but in the absence of the sulfonated copolyester; this yielded a latex having a solids content of a particle size of 0.19 micrometer and a composition on a weight basis as follows:
  MMA: 47.5%
  EA: 36.1%
  MAA: 10.6%
  vinyl acetate: 5.6%

Using the method of Example 1, a PET film was prepared, comprising an adhesion primer, by depositing 0.2 g per m² of the acrylic latex obtained previously. Specimens of the film produced were coated with the same final use coating as that employed in the case of films B, C and D in Example 1. Films E′, F′ and G′ were obtained and were subjected to the adhesion tests as before. The results are reported in the Table III below:

TABLE III

| FILM | E′ | F′ | G′ |
|---|---|---|---|
| OVERALL SCORE | 8 | 1 | 3 |

Comparison of the values in Table III with the values in Table II reveals that the results obtained using a conventional acrylic primer were inferior to those obtained using a sulfonated polyester/acrylic derivative copolymer.

EXAMPLE 3

Latexes having a solids content of 22% were prepared by diluting the latexes employed in Example 2, together with films comprising an adhesive primer formed by depositing the same quantity of latex. The final coatings employed for the films E, F and G were then deposited onto the PET films, and then the films obtained: H, I and J and H′, I′ and J′ were subjected to adhesion tests. Lastly, films H″, I″ and J″ were produced using an adhesive primer obtained by the addition, to the control latex employed for the films I′, J′ and H′, of a quantity of the sulfonated copolyester of Example 1, corresponding to a 20% content on a weight basis, based on the latex solids. The results reported in Table IV were obtained:

TABLE IV

| FILM | Example 3 | | | Comparative test II | | | Comparative test III | | |
| --- | --- | --- | --- | --- | --- | --- | --- | --- | --- |
|  | H | I | J | H' | I' | J' | H'' | I'' | J'' |
| OVERALL SCORE | 6 | 3 | 7 | 1 | 1 | 1 | 5 | 2 | 2 |

EXAMPLE 4

A sulfonated polyester/acrylic monomer latex was prepared following the procedure of Example 1 and using the same reactant and adjuvant proportions, but in the presence of 0.6% by weight, based on the monomers, of tert-dodecyl mercaptan as chain transfer agent. The latex obtained contained 45% solids on a weight basis. The polymer had a particle size of 0.18 micrometer.

Using the various stages of Example 1, films coated with the adhesive primer (0.15 g/m$^2$ and the final use coatings employed for the films A, B, C and D were prepared. The films obtained, K, L, M and N, were subjected to the same adhesion tests, the results of which are reported in Table V:

TABLE V

| FILM | K | L | M | N |
| --- | --- | --- | --- | --- |
| OVERALL SCORE | 10 | 10 | 8 | 8 |

EXAMPLE 5

A sulfonated polyester/acrylic monomer latex was prepared following the procedure of Example 1 and using the same reactant and adjuvant proportions, but operating in the presence of 3% by weight, based on the monomers, of ethylene dimethacrylate, and in the absence of the chain transfer agent. The latex obtained had a solids content of 45% by weight. The polymer had a particle size of 0.16 micrometer.

Films coated with the adhesive primer (0.2 g/m$^2$) and the final use coatings employed for the films A, B, C and D were prepared using the various steps of Example 1. The films obtained, O, P, Q and R, were subjected to the same adhesion tests, the results of which are reported in Table VI:

TABLE VI

| FILM | O | P | Q | R |
| --- | --- | --- | --- | --- |
| OVERALL SCORE | 10 | 9 | 7 | 8 |

EXAMPLE 6

A sulfonated polyester/acrylic monomer latex was prepared following the procedure of Example 1 and with the same reactant and adjuvant proportions, but with the addition of 10% by weight, based on the latex, of a melamine/formaldehyde polycondensate marketed under the trademark Prox FU by Protex. The latex obtained had a solids content of 45% by weight. The polymer had a particle size of 0.13 micrometer.

Films coated with the adhesive primer (0.15 g/m$^2$) and the final use coatings employed for films A, B, C and D were prepared using the various steps of Example 1. The films obtained, R, S, T and U, were subjected to the same adhesion tests, the results of which are reported in Table VII:

TABLE VII

| FILM | R | S | T | U |
| --- | --- | --- | --- | --- |
| OVERALL SCORE | 10 | 7 | 10 | 9 |

EXAMPLE 7

The same sulfonated polyester/acrylic monomers latex, having a solids content of 22%, as in Example 3, was prepared, with the addition of 10% by weight of the same melamine/formaldehyde polycondensate as in Example 6.

Films coated with the adhesive primer (0.29 g/m$^2$) and the final use coatings employed to obtain films I and J in Example 3 were prepared using the various steps of Example 1. The films prepared in this manner, V and W, were subjected to the adhesion tests described above. The results obtained are reported in Table VIII below.

Comparative test

By way of comparison, a sufficient amount of the sulfonated copolyester/acrylic monomers copolymer to provide a sulfonated copolyester content of 20% by weight based on the solids content and 10% by weight of the melamine/formaldehyde polycondensate employed previously were added to the acrylic latex employed to prepare films H', I' and J' in the comparative test I. Using the same method as before, films V' and W' were obtained and subjected to the same adhesion tests as films V and W. The results are reported in Table VIII:

TABLE VIII

| FILM | Example 7 | | Comparative test IV | |
| --- | --- | --- | --- | --- |
|  | V | W | V' | W' |
| OVERALL SCORE | 8 | 7 | 4 | 2 |

EXAMPLE 8

A sulfonated polyester/acrylic monomers latex was prepared according to the method of Example 1, after N-methylolmethacrylamide (3% by weight) was added to the mixture of acrylic monomers.

The latex obtained had a solids content of 43% by weight.

Films coated with the adhesive primer (0.15 g/m$^2$) and the final use coatings employed for films A, B, C and D were prepared using the various steps described in Example 1. The films obtained, X, Y, Z and $Z_1$, were subjected to the same adhesion tests, the results of which are reported in Table IX:

TABLE IX

| FILM | X | Y | Z | $Z_1$ |
| --- | --- | --- | --- | --- |
| OVERALL SCORE | 10 | 7 | 8 | 8 |

EXAMPLE 9

Following the procedure of Example 1, a polyethylene terephthalate base film was prepared, 12 micrometers in thickness and coated with the adhesive primer described in Example 5. The coated film obtained in this manner was used to prepare composite films intended for packaging by adhesive bonding of a polyethylene film using three different polyurethane adhesives, on the coated face surface of the base film. Specimens 15 mm in width were cut from the composite film obtained and used in tests for the separation of the polyester and polyethylene films.

In these tests, the separation of the two films was initiated with ethyl acetate, on the one hand in the lengthwise direction and, on the other hand, in the transverse direction. After drying the specimens, each leading edge of each specimen was fastened in the jaws of a traction apparatus which applied a stripping force to the leading edges. The jaws moved at a speed of 300 mm/min in a direction at right angles to the plane of the specimen. The force, in g, exerted to produce a delamination of 15 mm in the composite film was noted. The following adhesives were employed (trademarks):

Adcote 301/350 from Morton (test A)
Liofol 2850/5000 from Henkel (test B)
Wikolin 691A/691C (test C)

By way of comparison, these tests were repeated on composite films obtained without an adhesive primer (tests A', B' and C'). The results reported in Table X were obtained:

TABLE X

|  | A | | A' | | B | | B' | | C | | C' | |
|---|---|---|---|---|---|---|---|---|---|---|---|---|
|  | (1) | (1) | | | | | | | | | | |
| Tests | L | T | L | T | L | T | L | T | L | T | L | T |
| Delamination force in g | 300 | 280 | 180 | 180 | 300 | 200 | 130 | 80 | 280 | 240 | 140 | 220 | impression cylinders: 55° Shore;
temperature of the casings: 100° C.;
printing speed: 100 m/min.

The printed films were then laminated in known manner to a polyethylene film 60 micrometers in thickness, after the deposition on the printed layer of an adhesive of trademark Adcote 76C 301A/350A from the Morton Company (2 g/m²).

By way of comparison, the initial polyester base film devoid of a primer coating was printed and then laminated according to the procedure described above. Laminated printed control films given references FIT-1 and FIT-2 were obtained.

Test specimens 15 mm in length were cut from the films produced in this manner and these were used for measurements of the delamination force of the composite films using a Lhomargy trademark apparatus with a delamination speed of 200 m/min according to the procedure described in Example 9; the results reported in Table XI below were obtained, in which the first number shows the value of the delamination force in grams in the lengthwise direction and the second the value in the transverse direction.

TABLE XI

| FILMS | FI-1 | FI-2 | FI-3 | FI-4 | FI-5 | FI-6 | FI-7 | FI-8 | FIT-1 | FIT-2 |
|---|---|---|---|---|---|---|---|---|---|---|
| Delamination force in g | 800 >800 | 700 >600 | 500 600 | 700 800 | 550 550 | 500 500 | 40 400 | 600 500 | <10 <10 | <10 <10 |

EXAMPLE 10

Following the procedure of Example 1, a polyester film 12 micrometers in thickness was coated, after a corona treatment, with the latices described in Examples 2, 4 and 5 and with a solution produced by diluting the latex of Example 4 with water such as to adjust its solids concentration to 20% by weight, followed by neutralization with aqueous ammonia. In each case, 0.2 g/m² of solids were deposited on one of the face surfaces of the polyester film. Films with primer coatings given references FP1, FP2, FP3 and FP4 were produced in this manner. These four films were subjected to a printing operation on the primer coating using, on the one hand, a white ink of trademark CTSW2 S/8662 from the Lorilleux Company (flat printing) and, on the other hand, a superposition printing operation using the above white ink and a blue ink of trademark CTSW2 S/8656 from Lorilleux. Printed films given references FI 1; FI 2; FI 3; FI 4; FI 5; FI 6; FI 7 and FI 8 were produced in this manner.

The printing operation was carried out under the following conditions:
Rotovamoser trademark printing machine;
printing process: heliography;
etching: halftone;

EXAMPLE 11

Printed and laminated films were prepared by printing the films with a primer coating FP1 to FP4 described earlier using a white ink of trademark Sicpanyl 50 920 from the SICPA Company on the one hand, and using an overprinting with a red Sicpanyl 68 840 ink on the white ink on the other hand. The printing operation was carried out on a Netchich trademark machine with a 40-micrometer roll. Printed films FI-9 to FI-16 were obtained and a 60-micrometer polyethylene film was deposited onto these after coating of the printed face surface with Adcote 301/350A adhesive. Laminated printed films given references FI-9 to FI-16 were obtained in this manner.

By way of comparison, polyester film without any primer coating was printed and laminated under the same conditions to produce two control films FIT-3 and FIT-4.

Measurements of the delamination force of these composite films were carried out under the conditions described in the preceding example. The results are reported in Table XII below:

TABLE XII

| FILMS | FI-9 | FI-10 | FI-11 | FI-12 | FI-13 | FI-14 | FI-15 | FI-16 | FIT-3 | FIT-4 |
|---|---|---|---|---|---|---|---|---|---|---|
| Delamination force in g | 90 — | 120 130 | 120 130 | 70 80 | 150 170 | 150 160 | 200 220 | 190 200 | 20 | 20 |

EXAMPLE 12

Following the procedure of Example 11, printed films were prepared and laminated to polyethylene after the Sicpanyl 50 920 and 68 840 inks were replaced, respectively, with SICPA inks Uniplex 79 900 (white) and 79 960 (blue). Films printed in white given references FI-17 to FI-20 and white-blue overprinted films FI-21 to FI-24 were obtained, as well as the controls FIT-5 and FIT-6.

The delamination forces determined as in Example 10 are reported in the following Table XIII:

TABLE XIII

| FILMS | FI-17 | FI-18 | FI-19 | FI-20 | FIT-5 | FI-21 | FI-22 | FI-23 | FI-24 | FIT-6 |
|---|---|---|---|---|---|---|---|---|---|---|
| Delamination force in g | 500 / 600 | 510 / 530 | 550 / 560 | 520 / 540 | 220 / 250 | 500 / 520 | 520 / 530 | 400 / 500 | 540 / 550 | 440 / 450 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A shaped article comprising an oriented linear polyester film having, on at least one of the face surfaces thereof, an adhesive primer coating which comprises a layer of a modified polymer produced by aqueous phase radical polymerization of at least one acrylic monomer in the presence of an effective amount of a water-dispersible polyester of at least one aromatic dicarboxylic acid and at least one aliphatic diol, and containing a plurality of sulfonyloxy groups of the general formula:

$$(-SO_3-)_n M \qquad (I)$$

in which M is a hydrogen atom, an alkali or alkaline earth metal, or an ammonium or quaternary ammonium residue, and n is equal to 1 or 2.

2. The shaped article as defined by claim 1, said polyester base film comprising a polyethylene terephthalate film having a thickness of 5 to 300 micrometers.

3. The shaped article as defined by claim 1, wherein the dispersible polyester comprises a plurality of recurring units derived from ethylene glycol or oligomers thereof having the formula $HO-CH_2-CH_2-O)_n H$, in which n is an integer of from 2 to 10.

4. The shaped article as defined by claim 1, said acrylic monomer having the general formula:

$$\underset{CH_2=C-Y}{\overset{R}{|}} \qquad (II)$$

in which R is a hydrogen atom or a lower alkyl radical, or hydroxyl substituted lower alkyl radical; Y is a hydroxycarbonyl radical, an alkoxycarbonyl radical of the formula $-COOR_1$ in which $R_1$ is a straight or branched chain alkyl radical containing from 1 to 20 carbon atoms or a hydroxyl substituted such alkyl radical, a nitrile radical, an amide radical of the formula $-CON(R_2,R_3)$ in which $R_2$ and $R_3$, which are identical or different, are each a hydrogen atom or a straight or branched chain alkyl residue containing from 1 to 20 carbon atoms, with the proviso that one of the radicals $R_2$ and $R_3$ may be hydroxyalkyl radical in which the alkyl moiety is as defined under $R_2$ and $R_3$.

5. The shaped article as defined by claim 1, said acrylic monomer comprising methyl acrylate, methyl methacrylate, ethyl acrylate, ethyl methacrylate, acrylic acid, methacrylic acid, acrylamide, methacrylamide, N-methylolacrylamide or N-methylolmethacrylamide.

6. The shaped article as defined by claim 1, said acrylic monomer comprising a minor amount of at least one nonacrylic ethylenically unsaturated monomer.

7. The shaped article as defined by claim 1, said water-dispersible polyester comprising at least 5% by weight of said modified polymer.

8. The shaped article as defined by claim 1, said modified dispersible polyester/acrylic monomer polymer having been coated from aqueous dispersion thereof.

9. The shaped article as defined by claim 1, said modified polymer comprising an aqueous solution produced by neutralization with an alkaline base.

10. The shaped article as defined by claim 1, said modified polymer comprising from 0.1 to 15% by weight of a phenol/formaldehyde or amine/formaldehyde resin crosslinking agent.

11. The shaped article as defined by claim 1, comprising from 0.01 to 0.5 g/m² of modified dispersible polyester/acrylic monomer polymer deposited onto said at least one face surface of the polyester base film.

12. The shaped article as defined by claim 1, said polyester film having been coated prior to any drawing thereof, or intermediate two drawings in perpendicular directions.

13. The shaped article as defined by claim 1, wherein the dispersible polyester comprises a copolyester containing a plurality of recurring units derived from at least two dicarboxylic acids, one of which comprises at least one sulfonyloxy group, and a plurality of recurring units derived from at least one aliphatic diol.

14. The shaped article as defined by claim 13, wherein the number of recurring units derived from a dicarboxylic acid comprising a sulfonyloxy group ranges from 5 to 30 for a total of 100 recurring units derived from dicarboxylic acids.

15. The shaped article as defined by claim 13, wherein the water-dispersible polyester comprises a plurality of recurring units derived from 5-sulfoisophthalic acid.

16. The shaped article as defined by claim 1, wherein the dispersible polyester comprises a copolyester containing a plurality of recurring units derived from at least one of terephthalic, isophthalic and phthalic acids.

17. The shaped article as defined by claim 16, wherein the dispersible polyester comprises a copolyester containing a plurality of recurring units derived from tere- and isophthalic acids.

18. The shaped article as defined by claim 17, wherein the dispersible polyester comprises a copolyester in which the number of terephthalate recurring units ranges from 20 to 99% of the total number of terephthalate and isophthalate recurring units.

19. A composite polyester film comprising the primer coated polyester as defined by claim 1, said primer layer itself bearing an outer topcoating.

20. The composite polyester film as defined by claim 19, said outer topcoating comprising a polyethylene film.

21. The composite polyester film as defined by claim 19, said outer topcoating comprising a printing ink.

22. The composite polyester film as defined by claim 19, said outer topcoating comprising a metal layer.

23. The composite polyester film as defined by claim 19, said outer topcoating comprising polyvinyl alcohol.

24. The composite polyester film as defined by claim 19, said outer topcoating comprising an acrylic polymer.

25. The composite polyester film as defined by claim 19, said outer topcoating comprising cellulose.

* * * * *